(12) United States Patent
Hirota

(10) Patent No.: US 6,997,000 B2
(45) Date of Patent: Feb. 14, 2006

(54) REFRIGERATION SYSTEM AND METHOD OF OPERATION THEREFOR

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 10/720,167

(22) Filed: Nov. 25, 2003

(65) Prior Publication Data

US 2004/0103677 A1 Jun. 3, 2004

(30) Foreign Application Priority Data

Dec. 2, 2002 (JP) .............................. 2002-350151

(51) Int. Cl.
F25B 41/00 (2006.01)
F25B 43/00 (2006.01)

(52) U.S. Cl. ............................ 62/174; 62/197; 62/216; 62/503

(58) Field of Classification Search .................. 62/216, 62/217, 197, 149, 174, 503, 509
See application file for complete search history.

(56) References Cited

U.S. PATENT DOCUMENTS

| | | | | |
|---|---|---|---|---|
| 3,668,883 A | * | 6/1972 | Ruff et al. ..................... | 62/158 |
| 5,983,657 A | * | 11/1999 | Murata et al. ............. | 62/228.3 |
| 5,996,369 A | | 12/1999 | Hirota ....................... | 62/324.6 |
| 6,244,059 B1 | | 6/2001 | Hill .............................. | 62/193 |
| 6,672,090 B1 | * | 1/2004 | Healy et al. .................. | 62/203 |
| 2002/0011073 A1 | | 1/2002 | Flynn .......................... | 62/129 |

FOREIGN PATENT DOCUMENTS

JP 2002-147898 5/2002

OTHER PUBLICATIONS

Copy of European Search Report dated Mar. 12, 2004.

* cited by examiner

*Primary Examiner*—Marc Norman
(74) *Attorney, Agent, or Firm*—Westerman,Hattori, Daniels & Adrian LLP

(57) ABSTRACT

The object of the present invention is to prevent refrigerant from flowing out into a vehicle compartment due to damage to an evaporator or piping associated therewith. A solenoid valve is arranged at an inlet of an evaporator, and a check valve is arranged at an outlet of the evaporator. When operation of a system is to be stopped, the solenoid valve is closed while a compressor is kept operating for a predetermined time to suck out refrigerant from the evaporator to a downstream side of the check valve, so that during stoppage of the operation, the check valve prevents the refrigerant from flowing back into the evaporator. Thus, even if the evaporator arranged in the vehicle compartment or piping associated therewith is damaged, a situation where a large amount of refrigerant flows out of the evaporator into the vehicle compartment does not occur because no refrigerant remains in the evaporator, making it possible to prevent occupants in the vehicle compartment from being put in a grave situation.

6 Claims, 5 Drawing Sheets

REFRIGERATION SYSTEM AND METHOD OF OPERATION THEREFOR

CROSS-REFERENCES TO RELATED APPLICATIONS, IF ANY

This application claims priority of Japanese Application No. 2002-350151 filed on Dec. 2, 2002 and entitled "Refrigeration System and Method of Operation Therefor".

BACKGROUND OF THE INVENTION (1) Field of the Invention

The present invention relates to a refrigeration system and a method of operation therefor, and more particularly, to a refrigeration system for use in an automotive air conditioner which uses a gas harmful to the human body as a refrigerant and a method of operation for such a refrigeration system.

(2) Description of the Related Art

A refrigeration system used in an automotive air conditioner generally comprises a compressor for compressing a refrigerant circulating through the refrigeration cycle, a condenser for condensing the compressed refrigerant, a receiver for temporarily storing the refrigerant circulating through the refrigeration cycle while at the same time separating the condensed refrigerant into gas and liquid, an expansion valve for adiabatically expanding the liquid refrigerant, and an evaporator for evaporating the expanded refrigerant and then returning the refrigerant to the compressor (see Japanese Unexamined Patent Publication No. 2002-147898 (Paragraph No. [0001], FIG. 1), for example).

In the refrigeration cycles of automotive air conditioners, chlorofluorocarbon substitute gas has hitherto been used as the refrigerant, but in consideration of global warming, there has been a demand for refrigerants with smaller Global Warming Potential. For example, carbon dioxide, propane, etc. have been proposed as such refrigerants.

In the case of using carbon dioxide, propane, etc. as the refrigerant, however, a problem arises in that, if the refrigerant leaks because of damage to the evaporator arranged in the vehicle compartment or to piping installed in the vehicle compartment, the occupants can possibly be put in a grave situation such as suffocation due to deficiency of oxygen or outbreak of fire.

SUMMARY OF THE INVENTION

The present invention was created in view of the above circumstances, and an object thereof is to provide a refrigeration system and a method of operation therefor whereby, while an automotive air conditioner is not in use, refrigerant does not leak out into a vehicle compartment even if an evaporator or piping arranged in the vehicle compartment is damaged.

To solve the above problem, the present invention provides a refrigeration system including an evaporator arranged in a vehicle compartment, the refrigeration system being characterized by comprising a solenoid valve arranged at an inlet of the evaporator and capable of shutting off a refrigerant passage between an expansion valve and the evaporator when operation of the system is to be stopped and during stoppage of the operation, and a check valve arranged at an outlet of the evaporator, for preventing a refrigerant sucked by a compressor when the operation of the system is to be stopped, from flowing back into the evaporator during the stoppage of the operation.

The present invention also provides a method of operation for a refrigeration system used in an automotive air conditioner, the method of operation for a refrigeration system being characterized in that when operation of the automotive air conditioner is stopped, a refrigerant in an evaporator is collected beforehand.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described in detail with reference to the drawings, wherein the invention is applied, by way of example, to an automotive air conditioner.

Figure 1:
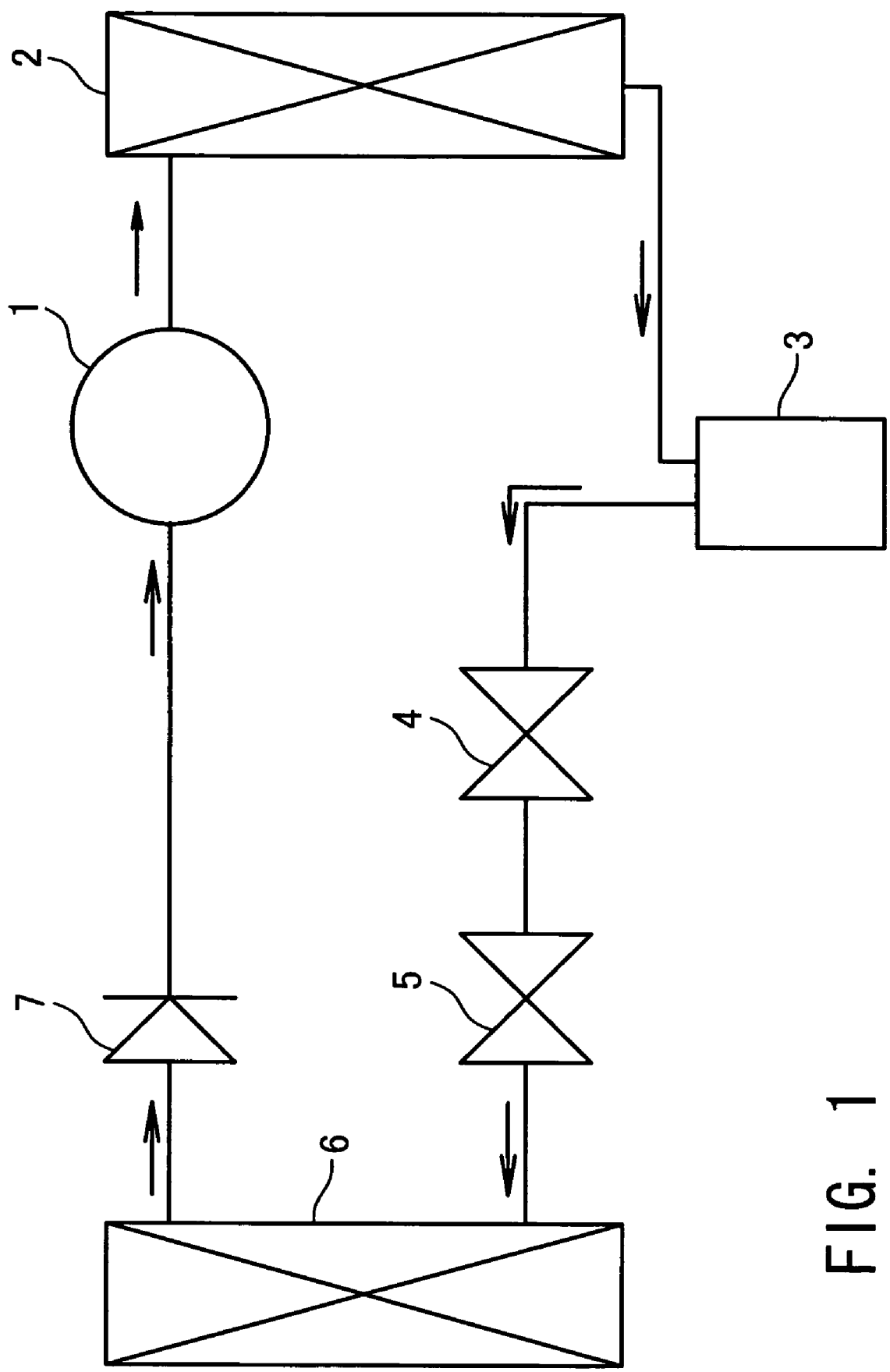
FIG. 1 is a system diagram illustrating a refrigeration system according to a first embodiment.

FIG. 1 is a system diagram illustrating a refrigeration system according to a first embodiment.

The refrigeration system comprises a compressor 1 for compressing a circulating refrigerant, a condenser 2 for condensing the compressed refrigerant, a receiver 3 for storing the refrigerant circulating in the refrigeration cycle and also separating the condensed refrigerant into gas and liquid, an expansion valve 4 for adiabatically expanding the liquid refrigerant, a solenoid valve 5 for shutting off a flow passage therein when the operation of the automotive air conditioner is to be stopped and during stoppage of the operation, an evaporator 6 arranged in the vehicle compartment for evaporating the refrigerant expanded by the expansion valve 4, and a check valve 7 for preventing the refrigerant from flowing from the compressor 1 back into the evaporator 6. Namely, compared with conventional systems, this refrigeration system is additionally provided with the solenoid valve 5 and the check valve 7 arranged at the inlet and outlet, respectively, of the evaporator 6.

In the refrigeration system configured as described above, while the automotive air conditioner is operated, the solenoid valve 5 is kept fully open. The refrigeration system therefore operates in the same manner as a conventional refrigeration system not including the solenoid valve 5 and the check valve 7 in its refrigeration cycle. Accordingly, the refrigerant compressed by the compressor 1 is condensed by the condenser 2 and enters the receiver 3. The liquid refrigerant separated in the receiver 3 is additionally expanded by the expansion valve 4 and then enters the evaporator 6 through the solenoid valve 5. The refrigerant evaporated in the evaporator 6 then passes through the check valve 7 and returns to the compressor 1. At this time, heat exchange with the air in the vehicle compartment takes place on the evaporator 6, whereby the air in the vehicle compartment is cooled.

When the operation of the automotive air conditioner is to be stopped, first, the solenoid valve 5 is closed to shut off the refrigerant passage between the expansion valve 4 and the evaporator 6. Thus, the refrigerant delivered under pressure from the compressor 1 is prevented from entering the evaporator 6. The compressor 1 is kept operating for a predetermined time after the solenoid valve 5 is closed. This causes a pressure drop in the suction chambers of the compressor 1, so that the refrigerant in the evaporator 6 can be sucked out.

Since the compressor 1 is kept operating for the predetermined time, the refrigerant in the evaporator 6 is sucked out to some degree, and when the evaporator 6 becomes empty, the operation of the compressor 1 is stopped.

After the operation of the compressor 1 is stopped, the compressor 1 no longer exerts suction force, and therefore, the refrigerant on the downstream side of the evaporator 6 tends to flow backward because of pressure difference. Such backflow of the refrigerant is, however, blocked by the check valve 7, thus preventing the refrigerant from flowing back into the evaporator 6. In this manner, the evaporator 6 can be emptied, and even if the evaporator 6 or pipes connected thereto is damaged, the refrigerant does not leak out into the vehicle compartment.

The compressor 1 is driven by the engine, and therefore, as long as the engine key is in ON position and the engine keeps operating, the refrigerant collecting operation can be performed when the operation of the automotive air conditioner is to be stopped. Thus, in the case where the operation of the automotive air conditioner is stopped at the same time the engine key is turned off, the engine needs to be kept operating for the predetermined time after the engine key is turned off, to collect the refrigerant for terminating the operation of the air conditioner.

Figure 2:
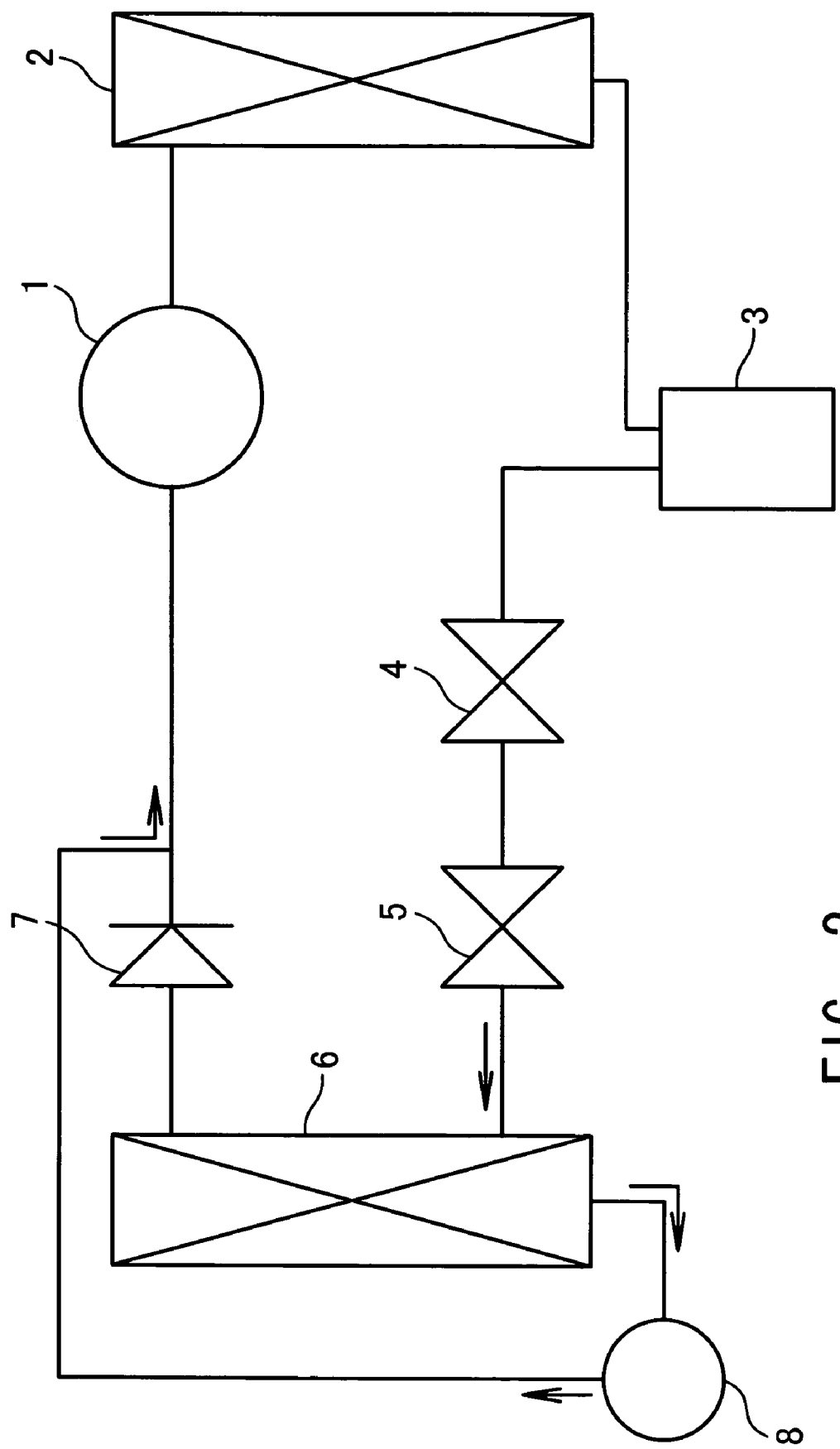
FIG. 2 is a system diagram illustrating a refrigeration system according to a second embodiment.

FIG. 2 is a system diagram illustrating a refrigeration system according to a second embodiment. In FIG. 2, identical reference numerals are used to denote elements identical with those appearing in FIG. 1, and detailed description of such elements is omitted.

In the refrigeration system of the second embodiment, an electric motor-driven liquid pump 8 is arranged in a passage connecting between the bottom of the evaporator 6 and the downstream side of the check valve 7. While passing through the evaporator 6, the refrigerant does not always evaporate in its entirety, and the refrigerant that failed to evaporate remains in the bottom of the evaporator 6 in liquid form. The liquid pump 8 is used to collect such liquid refrigerant from the evaporator 6.

While the automotive air conditioner is operated, the solenoid valve 5 is kept fully open so that the refrigeration system may operate in the same manner as conventional refrigeration systems.

When the operation of the automotive air conditioner is to be stopped, the solenoid valve 5 is closed to shut off the refrigerant passage between the expansion valve 4 and the evaporator 6 and also the liquid pump 8 is operated, with the compressor 1 kept operating. Consequently, the gaseous refrigerant in the evaporator 6 is sucked out by the compressor 1 and at the same time the liquid refrigerant remaining in the evaporator 6 is sucked out by the liquid pump 8. After the liquid refrigerant remaining in the evaporator 6 is sucked out, the liquid pump 8 runs idle and the load thereof decreases. Accordingly, the driving current for the liquid pump 8, for example, is monitored, and when the driving current has decreased, it is judged that the collection of the liquid refrigerant is completed, whereupon the liquid pump 8 is stopped. The operation of the compressor 1 is continued thereafter to collect the gaseous refrigerant, and after a lapse of a predetermined time by which the evaporator 6 becomes empty, the operation of the compressor 1 is stopped.

In the refrigeration system of the second embodiment, where the operation of the automotive air conditioner is stopped at the same time the engine key is turned off, the liquid pump 8 alone may be started at the same time the engine key is turned off to stop the engine, and may be stopped when the collection of the liquid refrigerant from the evaporator 6 is completed.

Figure 3:
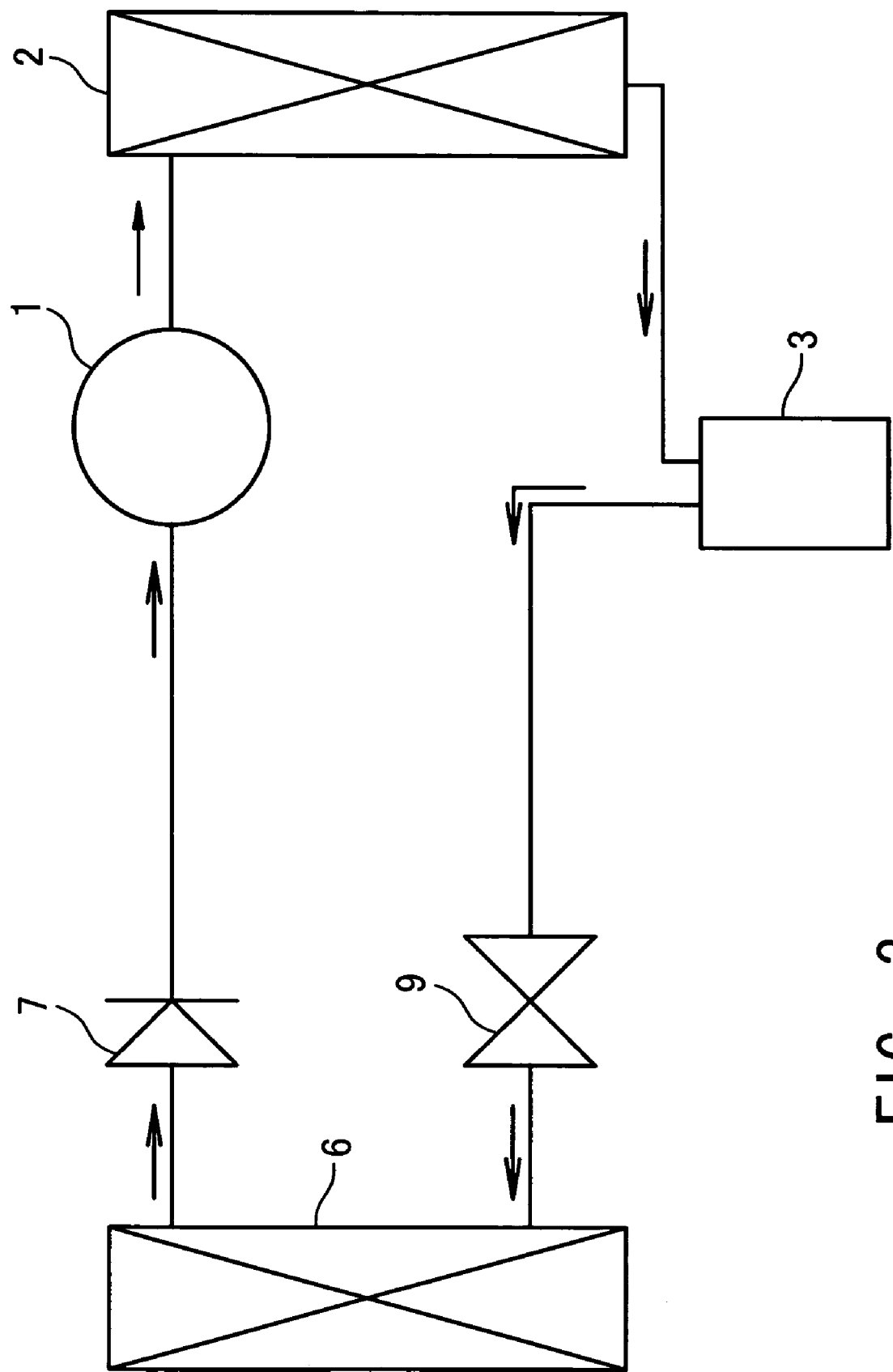
FIG. 3 is a system diagram illustrating a refrigeration system according to a third embodiment.

FIG. 3 is a system diagram illustrating a refrigeration system according to a third embodiment. In FIG. 3, identical reference numerals are used to denote elements identical with those appearing in FIG. 1, and detailed description of such elements is omitted.

In the refrigeration system of the third embodiment, a solenoid valve-equipped expansion valve 9 having the expansion valve 4 and the solenoid valve 5 integrated into a unit is arranged between the receiver 3 and the evaporator 6. The solenoid valve-equipped expansion valve 9, of which the valve element is fully closed when de-energized, has a perfectly sealed construction such that the valve section thereof is free from internal leakage while the valve element is fully closed, and has a function similar to that of the solenoid valve 5. Also, while the solenoid valve-equipped expansion valve 9 is energized, its valve lift is controlled in accordance with an electric current supplied to the valve 9, so that the valve 9 has a function identical to that of the expansion valve 4.

By using the solenoid valve-equipped expansion valve 9, it is possible to configure the refrigeration system of the present invention with substantially the sole addition of the check valve 7. Also, in this refrigeration system, the liquid pump 8 shown in FIG. 2 may be used in combination.

Figure 4:
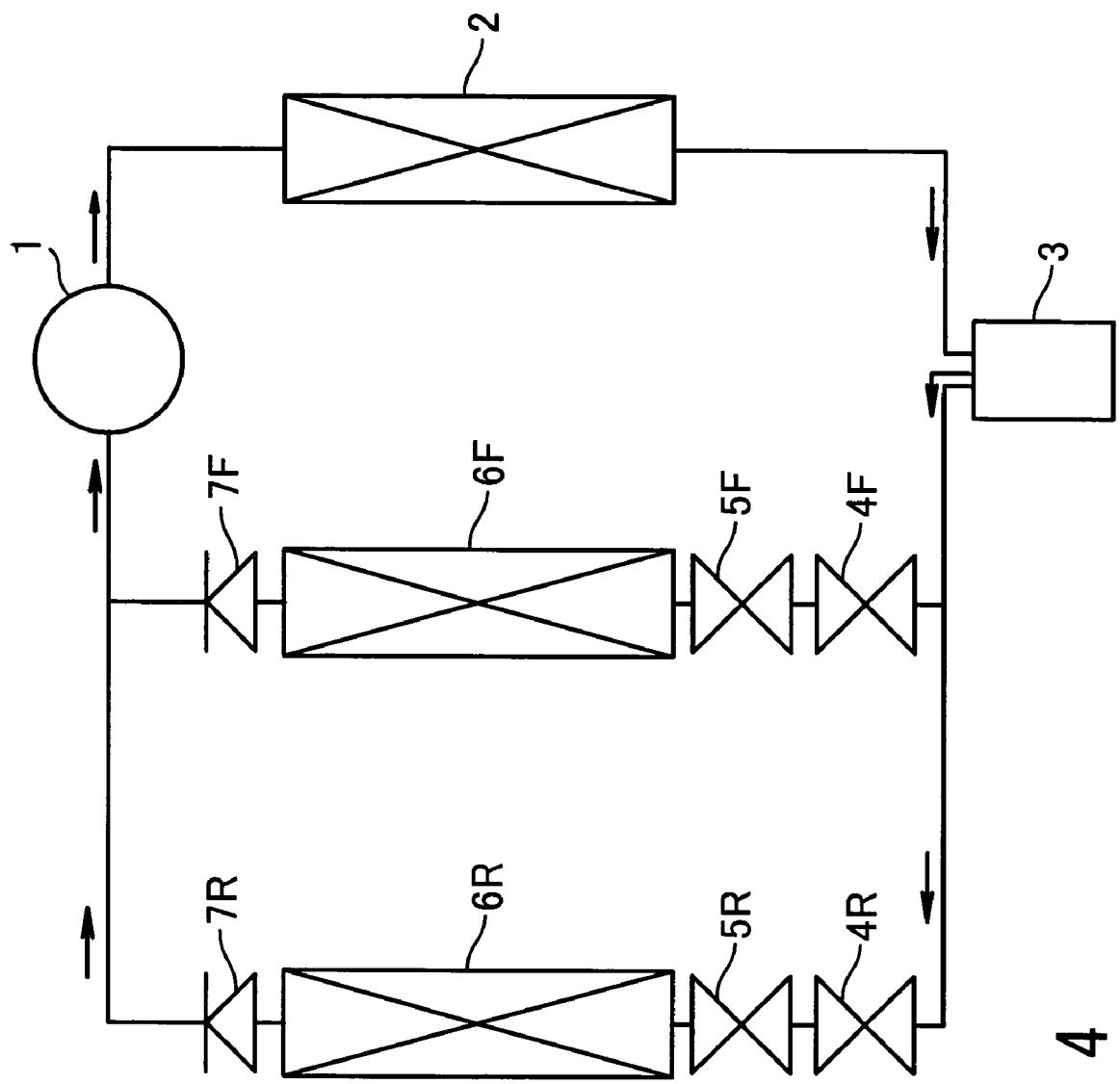
FIG. 4 is a system diagram illustrating a refrigeration system according to a fourth embodiment.

FIG. 4 is a system diagram illustrating a refrigeration system according to a fourth embodiment. In FIG. 4, identical reference numerals are used to denote elements identical with those appearing in FIG. 1, and detailed description of such elements is omitted.

The refrigeration system of the fourth embodiment is for use in a so-called dual air conditioner whereby temperatures of the front-seat side and rear-seat side of the vehicle compartment can be controlled independently of each other.

The refrigeration system comprises, in addition to the compressor 1, condenser 2 and receiver 3, a circuit for the front-seat side which includes an expansion valve 4F, a solenoid valve 5F, an evaporator 6F and a check valve 7F, and a circuit for the rear-seat side which includes an expansion valve 4R, a solenoid valve 5R, an evaporator 6R and a check valve 7R. In refrigeration systems for dual air conditioners, the rear-side circuit is generally provided with the solenoid valve 5R in order to keep the refrigerant from flowing to the rear-side circuit while the air conditioning of the rear-seat side is stopped. Compared with conventional systems, therefore, this refrigeration system is additionally equipped with the front-side solenoid valve 5F and check valve 7F and the rear-side check valve 7R.

In the refrigeration system configured as described above, while the front-seat side alone is air-conditioned, the solenoid valve 5F of the front-side circuit is kept fully open and the solenoid valve 5R of the rear-side circuit is kept fully closed. This permits the refrigerant to flow only through the front-side circuit, making it possible to air-condition the front-seat side. In the rear-side circuit, on the other hand, the solenoid valve 5R prevents the refrigerant from flowing into the evaporator 6R, and the check valve 7R prevents the refrigerant coming out of the evaporator 6F from reverse flowing into the evaporator 6R and also permits the refrigerant to be collected from the evaporator 6R. Accordingly, almost all of the refrigerant in the evaporator 6R is collected to be circulated through the front-side circuit, whereby the front-side circuit never comes short of refrigerant and thus lowering of the cooling power due to deficiency of refrigerant does not occur.

When the rear-seat side also is to be air-conditioned, the solenoid valve 5R of the rear-side circuit is fully opened to allow the refrigerant to flow also through the rear-side circuit, whereby both the front-seat side and the rear-seat side can be air-conditioned.

When the operation of the automotive air conditioner is to be stopped, first, the solenoid valves 5F and 5R are closed to shut off the refrigerant passage between the expansion valve 4F and the evaporator 6F and the refrigerant passage between the expansion valve 4R and the evaporator 6R, respectively, so that the refrigerant delivered under pressure from the compressor 1 may not flow into the evaporators 6F and 6R. The compressor 1 is kept operating for a predetermined time after the solenoid valves 5F and 5R are closed, to collect the refrigerant from the evaporators 6F and 6R, and after a lapse of the predetermined time by which the evaporators 6F and 6R become empty, the operation of the compressor 1 is stopped. Also in this refrigeration system, the liquid pump 8 shown in FIG. 2 may be used in combination.

Figure 5:
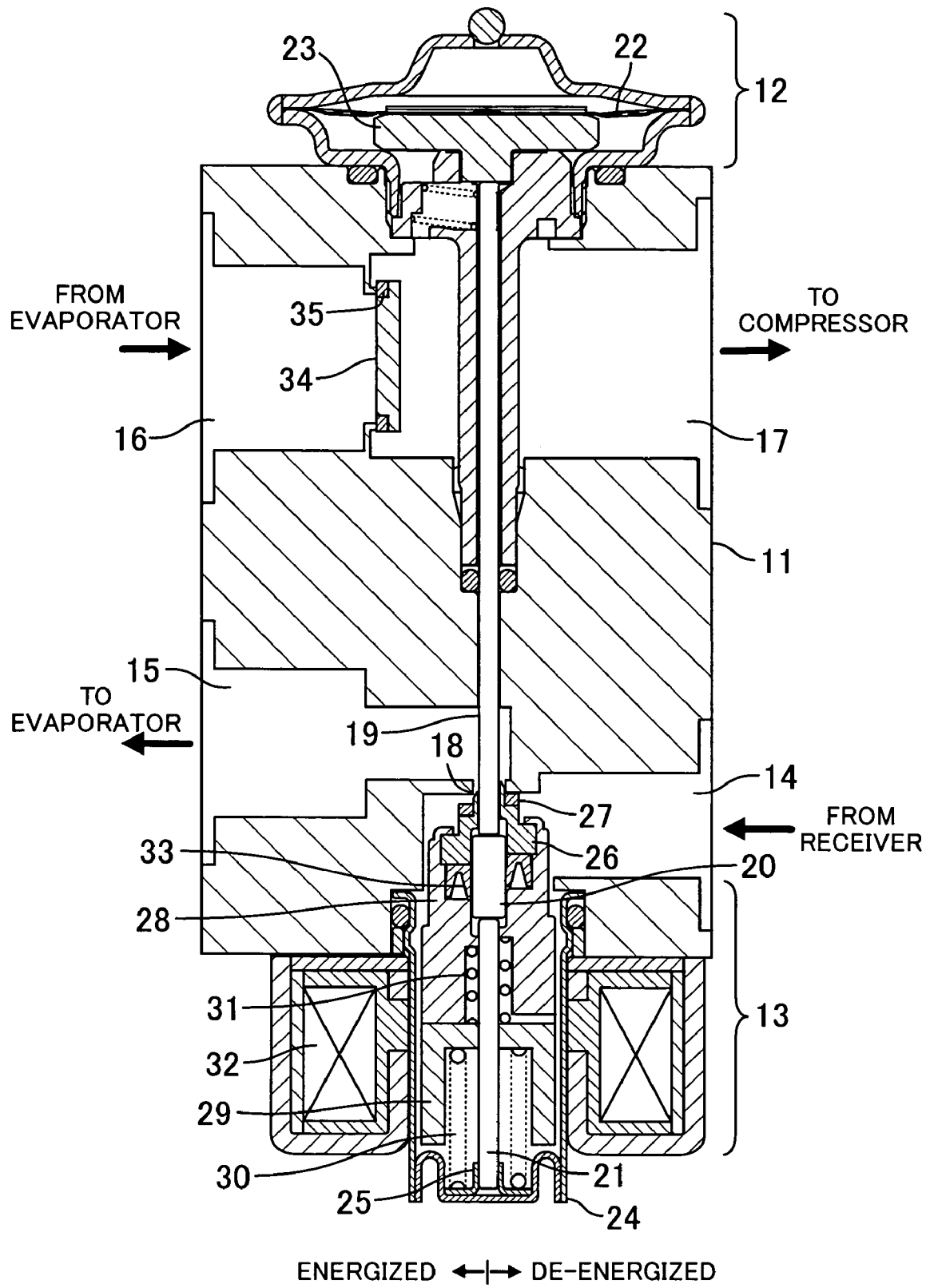
FIG. 5 is a sectional view of an exemplary integrated valve into which an expansion valve, a solenoid valve and a check valve are integrated as a unit.

FIG. 5 is a sectional view of an exemplary integrated valve into which an expansion valve, a solenoid valve and a check valve are integrated as a unit. In order to illustrate both the function of the integrated valve as a solenoid valve for shutting off a refrigerant passage and the function of the integrated valve as an ordinary expansion valve whose valve lift is controlled, the valve element and movable parts of the solenoid are shown in FIG. 5 in a manner such that the right half of the figure shows a valve closed state with the solenoid de-energized and that the left half of the figure shows a state in which the integrated valve functions as the expansion valve with the solenoid energized.

The integrated valve, into which are integrated the functions of the expansion valve 4, solenoid valve 5 and check valve 7 of the refrigeration system shown in FIG. 1, for example, comprises a body block 11 accommodating valve sections of the respective valves, a power element 12 for sensing the temperature and pressure of the refrigerant returned from the evaporator 6, and a solenoid 13 for switching between the solenoid valve function and the expansion valve function.

The body block 11 has a lateral portion provided with a port 14 for receiving the high-temperature, high-pressure liquid refrigerant from the receiver 3, a port 15 through which the low-temperature, low-pressure refrigerant adiabatically expanded in the integrated valve is supplied to the evaporator 6, a port 16 for receiving the refrigerant returned from the evaporator 6, and a port 17 through which the refrigerant received from the port 16 is supplied to the compressor 1.

A valve seat 18, which is formed as an integral part of the body block 11, is arranged in a fluid passage connecting the port 14 to the port 15. Through a valve hole defined by the valve seat 18 are arranged a shaft 19, a valve element guide 20 and a shaft 21 which are aligned so as to extend in the longitudinal direction of the integrated valve. The shaft 19 is slidably supported by the body block 11 and has an upper end abutting against a center disk 23 which is disposed on the lower surface of a diaphragm 22 of the power element 12. The shaft 21 also is axially slidably supported at its lower end by a bearing 25 formed in an iron core case 24 of the solenoid 13. The valve element guide 20 has both end faces abutting against the lower end of the shaft 19 and the upper end of the shaft 21, respectively.

A shared valve element 26, which is shared by the solenoid valve and the expansion valve, is arranged on an upstream side of the valve seat 18 so as to face the valve seat 18 and is movable to be in contact with and away from the valve seat 18 while being guided by the shaft 19 and the valve element guide 20. A flexible annular valve sheet 27 is attached to a portion of the shared valve element 26 where the element 26 is seated on the valve seat 18. Thus, the gap between the valve seat 18 and the shared valve element 26 constitutes a variable orifice for constricting the flow of the high-pressure refrigerant, and when passing through the variable orifice, the refrigerant adiabatically expands. The solenoid valve function is exercised when the solenoid 13 is de-energized and the shared valve element 26 is fully closed, and while the shared valve element 26 is fully closed, the valve sheet 27 perfectly seals the gap between the shared valve element 26 and the valve seat 18, thereby completely stopping the flow of the refrigerant.

The shared valve element 26 is held by a first iron core 28 of the solenoid 13, the first iron core being axially movable while being guided by the valve element guide 20 and the shaft 21. The first iron core 28 acts as a movable iron core for moving the shared valve element 26. Under the first iron core 28 is arranged a second iron core 29 which is secured to the shaft 21, acts as a fixed iron core and is urged upward by a spring 30. The shaft 21 is thus urged by the spring 30 such that the shaft 19 is pushed through the valve element guide 20 and always abuts against the center disk 23 of the power element 12. Also, a spring 31 is disposed between the first and second iron cores 28 and 29. While the solenoid is de-energized, the first iron core 28 is moved by the spring 31 in a direction away from the second iron core 29, whereby the valve sheet 27 on the shared valve element 26 held by the first iron core 28 is brought into urging contact with the valve seat 18, thereby maintaining the fully closed state. An electromagnetic coil 32 is arranged around the iron core case 24, and when energized, the coil 32 causes the first and second iron cores 28 and 29 to be attracted in contact with each other, so that the shared valve element 26 and the shaft 21 are electromagnetically coupled, making it possible to transmit displacement of the diaphragm 22 of the power element 12 to the shared valve element 26.

To prevent internal leakage, or more specifically, to prevent the refrigerant from leaking through the gap between the shared valve element 26 and the valve element guide 20 to the downstream side of the valve section while the shared valve element 26 is closed, V packing 33 is fitted in a space defined between the shared valve element 26 and the first iron core 28.

Also, a check valve 34 is arranged in a refrigerant passage between the port 16 for receiving the refrigerant from the evaporator 6 and the port 17 for returning the refrigerant to the compressor 1. In the illustrated example, the check valve 34 is located on the outlet side of a refrigerant passage through which the refrigerant flows from the port 16 to a space communicating with a lower chamber beneath the diaphragm. 22 to allow the power element 12 to sense the temperature and pressure of the refrigerant. Although not shown, the check valve 34 has legs formed as integral part thereof and guided in opening and closing directions along the inner wall of the refrigerant passage, and is urged in the valve closing direction by a spring with a small spring force. A flexible annular valve sheet 35 is attached to a seating portion of the check valve 34. Thus, while the solenoid 13 is de-energized to perform the solenoid valve function and thus the shared valve element 26 is fully closed, the check valve 34 allows the refrigerant to be sucked out of the evaporator 6 by the compressor 1, and after the compressor 1 is stopped, the check valve 34 prevents the refrigerant from flowing back into the evaporator 6 from the compressor 1.

In the integrated valve constructed as described above, when the automotive air conditioner is used, the solenoid 13 is energized. Accordingly, the first and second iron cores 28 and 29 are attracted and brought into contact with each other, so that the shared valve element 26 is indirectly fixed to the shaft 21. At this time, the first iron core 28 moves toward the second iron core 29, and therefore, the shared valve element 26 leaves the valve seat 18, so that the high-temperature, high-pressure refrigerant supplied to the port 14 from the receiver 3 flows to the port 15 through the gap between the shared valve element 26 and the valve seat 18. When passing through the gap, the high-temperature, high-pressure refrigerant adiabatically expands and turns into low-temperature, low-pressure refrigerant, which is then supplied from the port 15 to the evaporator 6.

In the evaporator 6, the refrigerant supplied from the integrated valve is made to evaporate by exchanging heat with the air in the vehicle compartment, and the evaporated refrigerant is returned to the integrated valve. The refrigerant returned from the evaporator 6 to the port 16 of the integrated valve passes through the check valve 34 and is returned to the compressor 1 through the port 17. At this time, the integrated valve senses the temperature and pressure of the refrigerant from the evaporator 6 by means of the diaphragm 22 of the power element 12, and the displacement of the diaphragm 22 corresponding to the temperature and pressure of the refrigerant is transmitted to the shared valve element 26 through the shaft 19, valve element guide 20, shaft 21, and first and second iron cores 28 and 29, to control the flow rate of the refrigerant.

When the automotive air conditioner is to be stopped, first, the solenoid 13 is de-energized. As a result, the first iron core 28 is urged by the spring 31 in a direction away from the second iron core 29, and thus the shared valve element 26 held by the first iron core 28 is seated on the valve seat 18 through the valve sheet 27. Accordingly, the integrated valve performs the solenoid valve function and shuts off its internal refrigerant passage, whereby no refrigerant flows into the evaporator 6. The compressor 1 is kept operating for a predetermined time after the solenoid 13 is de-energized, to suck the refrigerant out of the evaporator 6, and when the refrigerant in the evaporator 6 is emptied, the compressor is stopped. The refrigerant thus sucked out of the evaporator 6 is prevented from flowing back into the evaporator 6 by the check valve 34, so that the evaporator 6 remains in a state empty of refrigerant.

As described above, according to the present invention, the solenoid valve and the check valve are arranged at the inlet and outlet, respectively, of the evaporator, and when the operation of the refrigeration system is stopped, the refrigerant is collected in advance from the evaporator to the downstream side of the check valve. Accordingly, even if the evaporator arranged in the vehicle compartment or the piping associated therewith is damaged, a situation where a large amount of refrigerant flows out into the vehicle compartment does not occur, thus preventing the occupants in the vehicle compartment from being put in a grave situation such as ignition of the refrigerant or suffocation due to deficiency of oxygen that can possibly occur depending on the kind of refrigerant used.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A refrigeration system including an evaporator arranged in a vehicle compartment, characterized by comprising:
    a solenoid valve arranged at an inlet of the evaporator and capable of shutting off a refrigerant passage between an expansion valve and the evaporator when operation of the system is to be stopped and during stoppage of the operation;
    a check valve arranged at an outlet of the evaporator, for preventing a refrigerant sucked by a compressor when the operation of the system is to be stopped, from flowing back into the evaporator during the stoppage of the operation; and
    a liquid pump arranged in a passage connecting between a bottom of the evaporator and a downstream side of the check valve, the liquid pump being capable of collecting from the evaporator a liquid refrigerant stored therein.

2. A method of operation for a refrigeration system used in an automotive air conditioner,
    characterized in that when operation of the automotive air conditioner is stopped, a refrigerant in an evaporator is collected beforehand by sucking the refrigerant in the evaporator and preventing the refrigerant from flowing in the evaporator.

3. The method of operation for a refrigeration system according to claim 2, characterized in that the collection of the refrigerant is carried out by shutting off a refrigerant passage on an inlet side of the evaporator and operating a compressor for a predetermined time to suck in the refrigerant from the evaporator through a check valve.

4. The method of operation for a refrigeration system according to claim 3, characterized in that a liquid refrigerant stored in a bottom of the evaporator is collected by an electric motor-driven liquid pump in response to a stop of the operation of the automotive air conditioner, and the liquid pump is stopped on detection of lowering of a load thereof.

5. The method of operation for a refrigeration system according to claim 2, characterized in that the collection of the refrigerant is carried out by shutting off a refrigerant passage on an inlet side of the evaporator, and deferring, in response to a turn-off operation of an engine key, an engine stop for a predetermined time to operate a compressor for the predetermined time, thereby sucking in the refrigerant from the evaporator through a check valve.

6. The method of operation for a refrigeration system according to claim 5, characterized in that a liquid refrigerant stored in a bottom of the evaporator is collected by an electric motor-driven liquid pump in response to a stop of the operation of the automotive air conditioner, and the liquid pump is stopped on detection of lowering of a load thereof.

* * * * *